(12) United States Patent  
Thrift et al.

(10) Patent No.: US 7,080,386 B2  
(45) Date of Patent: Jul. 18, 2006

(54) ARCHITECTURE WITH DIGITAL SIGNAL PROCESSOR PLUG-INS FOR GENERAL PURPOSE PROCESSOR MEDIA FRAMEWORKS

(75) Inventors: Philip R. Thrift, Dallas, TX (US); Schuyler T. Patton, Jr., Carrollton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 872 days.

(21) Appl. No.: 09/770,039

(22) Filed: Jan. 25, 2001

(65) Prior Publication Data

US 2001/0037408 A1     Nov. 1, 2001

Related U.S. Application Data

(60) Provisional application No. 60/177,941, filed on Jan. 25, 2000.

(51) Int. Cl.  
*G06F 3/00* (2006.01)

(52) U.S. Cl. ............... 719/328; 719/319; 719/329; 712/35

(58) Field of Classification Search ........ 719/315–319, 719/328, 329, 1, 108, 310; 712/35  
See application file for complete search history.

(56) References Cited

U.S. PATENT DOCUMENTS

| 5,392,448 | A  | * | 2/1995  | Frankel et al. ............... 712/35 |
| 5,842,014 | A  | * | 11/1998 | Brooks et al. .............. 709/103 |
| 5,933,641 | A  | * | 8/1999  | Ma .......................... 717/143 |
| 6,216,152 | B1 | * | 4/2001  | Wong et al. ................ 709/203 |
| 6,295,645 | B1 | * | 9/2001  | Brewer ...................... 717/178 |
| 6,445,697 | B1 | * | 9/2002  | Fenton ....................... 370/357 |
| 6,549,922 | B1 | * | 4/2003  | Srivastava et al. .......... 707/205 |
| 6,651,084 | B1 | * | 11/2003 | Kelley et al. ............... 709/202 |
| 6,658,027 | B1 | * | 12/2003 | Kramer et al. .............. 370/516 |
| 6,701,383 | B1 | * | 3/2004  | Wason et al. ................ 719/328 |

OTHER PUBLICATIONS

"An Introduction to the Java Media Framework Application Programming Interface," Jan. 1999, p. 1-14.*

* cited by examiner

*Primary Examiner*—Meng-Al T. An  
*Assistant Examiner*—Li Zhen  
(74) *Attorney, Agent, or Firm*—Carlton H. Hoel; W. James Brady; Frederick J. Telecky, Jr.

(57) ABSTRACT

A plug-and-play architecture including an extension of a general purpose processor media framework for adjoining DSP processing power.

2 Claims, 4 Drawing Sheets

ARCHITECTURE WITH DIGITAL SIGNAL PROCESSOR PLUG-INS FOR GENERAL PURPOSE PROCESSOR MEDIA FRAMEWORKS

CROSS-REFERENCE TO RELATED APPLICATIONS

This application claims priority from provisional application Ser. No. 60/177,941, filed Jan. 25, 2000.

BACKGROUND

The invention relates to media applications, and more particularly to systems and methods extending time-based media applications on a general purpose processor to a combination of a general purpose processor plus a digital signal processor.

Java Media Framework (JMF) is an application programming interface (API) for incorporating time-based media into Java applications and applets. Time-based media include audio clips, music synthesizer files, movie clips, and so forth. The JMF 2.0 API enables programmers to develop Java programs that present time-based media plus support for capturing and storing media data, controlling processing of media data streams, and defines a plug-in API that enables advanced developers to more easily customize and extend JMF functionality.

However, time-based media frequently require significant processing power (such as encoding/decoding MPEG video) and must adhere to real-time deadlines. And attempts to incorporate adjunct processors, such as digital signal processors (DSP) to provide supplemental processing power have led to complex and difficult to program systems.

SUMMARY OF THE INVENTION

The present invention provides an architecture with DSP plug-ins for general purpose processor media frameworks to take advantage of one or more DSPs communicating with the general purpose processor to provide adjunct processing power.

BRIEF DESCRIPTION OF THE DRAWINGS

The drawings are heuristic for clarity.

DETAILED DESCRIPTION OF THE PREFERRED EMBODIMENTS

Overview

Figure 1:
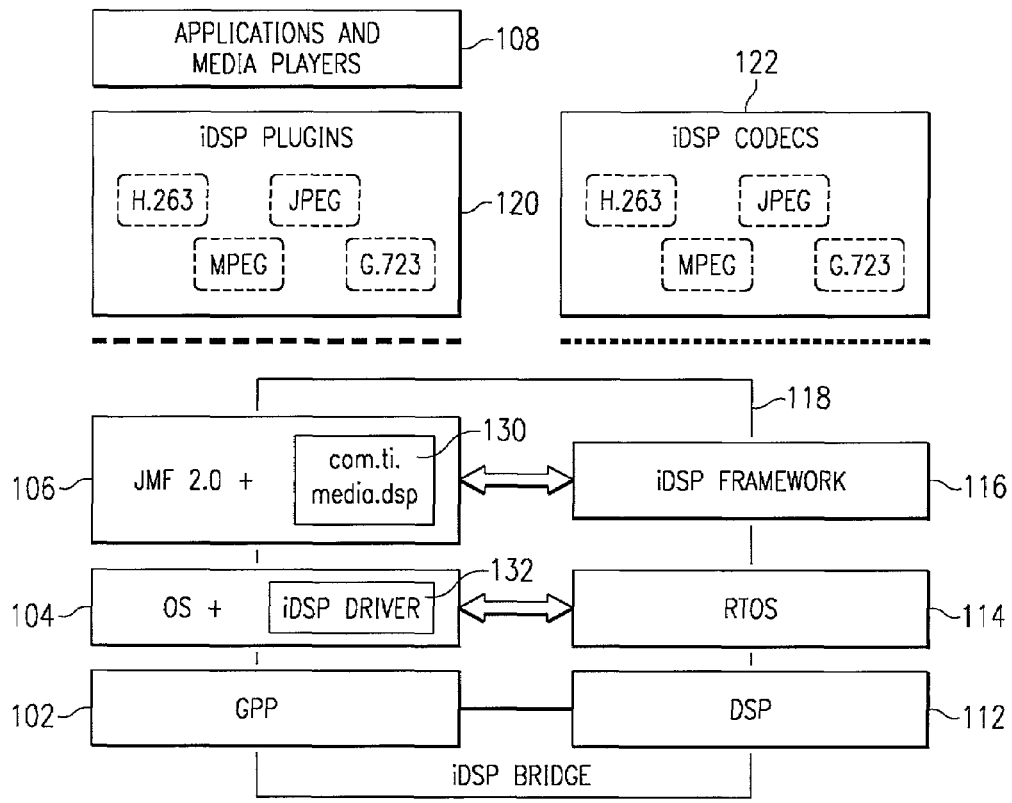
FIG. 1 shows a preferred embodiment instantiation.

The preferred embodiment systems include a hardware system composed of a general purpose processor (GPP), a digital signal processor (DSP), and connecting hardware such as shared memory or bus plus a software system extending a media framework of the GPP to provide DSP processor support for applications. FIG. 1 illustrates a preferred embodiment extending Java Media Framework 2.0 including GPP (such as a MIPS core) 102 with GPP operating system (such as Windows CE or VxWorks) 104 and media framework JMF 2.0 106 and Java media applications 108 together with DSP (such as a C6000 core) 112, DSP real-time operating system 114, DSP framework 116, bridge 118 for communication between the GPP and DSP portions, DSP plug-ins 120 for JMF 106 and corresponding DSP algorithms 122 plus DSP plug-in interface 130 extending JMF 106, and drivers 132 in operating system 104 for communication.

The DSP portion extends the GPP portion (GPP 102, OS 104, JMF 106, and application 108) and permits application 108 to easily incorporate objects which involve DSP media processing such as MPEG decoding. Indeed, the DSP portion extension constitutes an instance of a plug-and-play architecture that is "software pin compatible" with a media framework. FIG. 1 shows the instantiation of the architecture for solving the problem of obtaining decreased-cost, guaranteed-quality-of-service high-performance implementation of media frameworks for JMF 2.0 by plugging in DSP media components. Analogous instantiations adapt to media frameworks such as DirectShow and Be Media Kit.

Plug-in interface 130 provide a compliant extension to JMF and a media service and application programming interface (API) to plugging in DSP media components 120.

Figure 9:
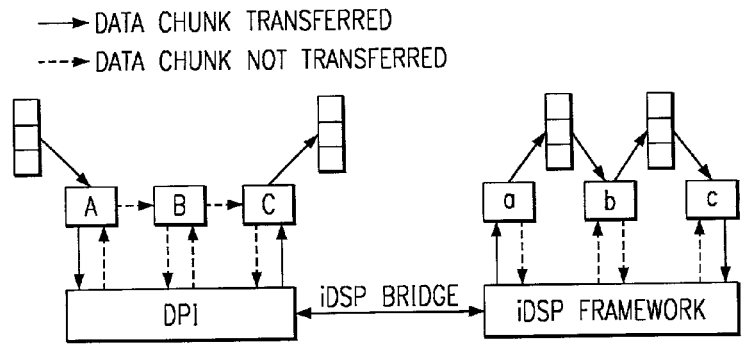
FIG. 9 shows data flow.

DSP framework 116 for DSP codecs (DSP algorithms) 122 allows DSP codec developers to plug-in optimized encoders, decoders, multiplexers, demultiplexers, and so forth for DSP processing. DSP framework 116 provides a consistent environment between a host GPP and codecs running on one or more DSPs connected to the host GPP. This environment provides for codecs to access input data, generate output data, and receive event synchronization that schedules runtime of the codec on the DSP. FIG. 9 illustrates exemplary data flow using three DSP codecs (a,b,c) with corresponding plug-ins (A,B,C) for the GPP media framework. The framework requires that the codecs 122 are written to a specific DSP interface standard (e.g., XDAIS) which matches the DSP framework interface 116.

DSP framework 116 also provides a quality-of-service (QOS) manager that will determine which codecs in the DSP will run based on a dynamically changeable user defined priority list and within in a user defined time period. The QOS manager informs the user on a per input data frame basis if DSP processing bandwidth has been exceeded for that time period.

Multiplexing channel drivers in the operating systems on both DSP and GPP sides of bridge 118 transfer data between the two processors.

Figure 10A:
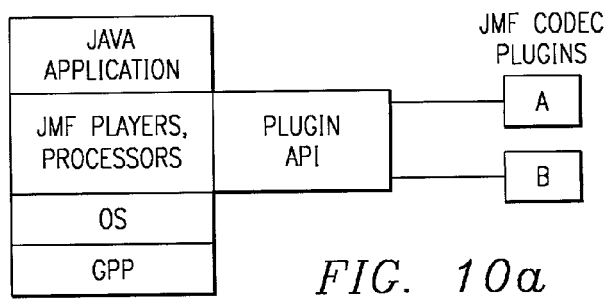
FIGS. 10a–10b compare without and with DSP acceleration.
Figure 10B:
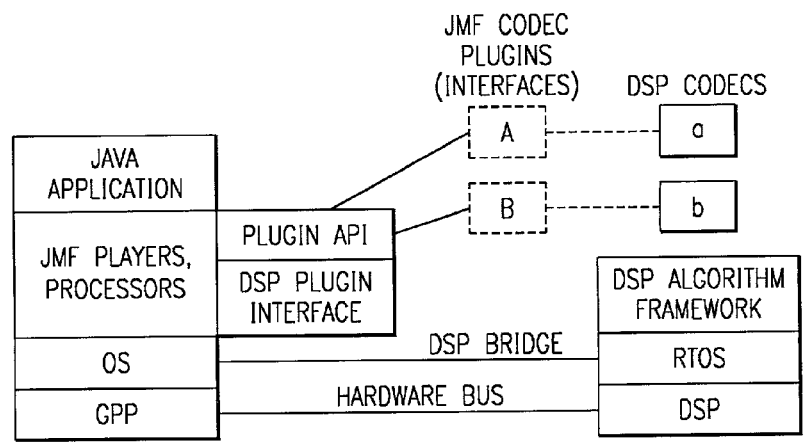

FIGS. 10a–10b compare standard JMF plug-ins (e.g., codecs) with the preferred embodiment approach. In particular, FIG. 10a illustrates JMF plug-ins A and B which run on the GPP; and FIG. 10b shows A and B with DSP acceleration. JMF PlugIns that typically run on the GPP are provided with high-performance versions that run on the DSP. The JMF PlugIn interface connects, in software, via the DSP Plug-in interface API to algorithms (e.g., codecs) running on the DSP. Data that needs to be processed on the DSP is transferred via the DSP bridge, and processed data is then returned over the same bridge.

The following sections have more details of the operation of the various elements of the architecture.

DSP System Framework

Figure 2:
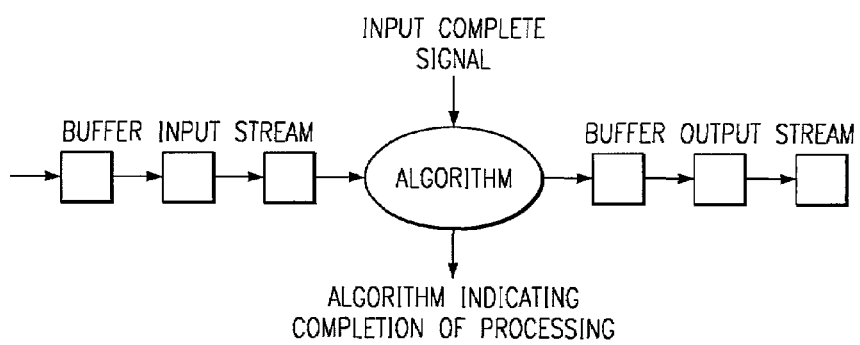
FIGS. 2–4 illustrate data flow.

DSP System Framework 116 provides an environment in which several DSP algorithms 122 can operate as an integrated system. A DSP Algorithm Interconnection Standard (DAIS)-compliant DSP algorithm requires data input and output and a synchronization signal to tell it when there is sufficient data ready for processing. Ideally the algorithm is set to run when there has been one complete frame of data received which when processed will provide one complete frame of output; see FIG. 2 illustrating the functionality.

Figure 3:
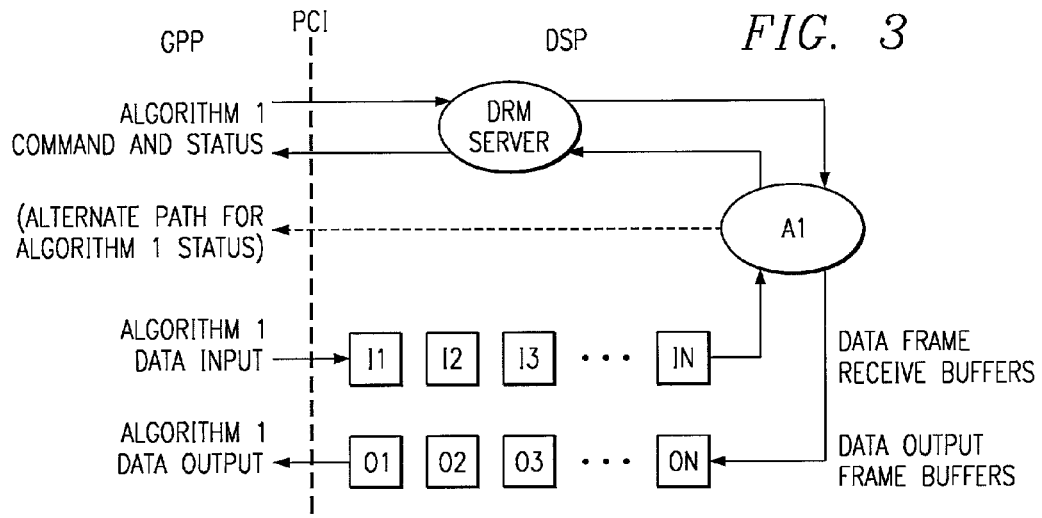

DSP System Framework 116 requires an information database on each Task (Algorithm) and a mechanism to do Task scheduling. The DSP system Resource Manager Server (DRMS) fulfills this function; see FIG. 3. The first responsibility of the DRMS is to manage an information database maintained for use by the framework. Each task is required to perform a registry process on initialization. The second responsibility of the DRMS is task scheduling, this is done implicitly because each task schedules its own execution separately by synchronizing on data input to the task.

Each Algorithm has to be integrated into the DSP system framework before it can be used. An Algorithm has to be DAIS-compliant, which means that the input and output buffer sizes and locations are defined prior to invocation. An algorithm can have parameters required at runtime and a pointer to the runtime parameters is passed on each invocation of the algorithm. These parameters will be made into a command passing structure described later on.

When a task initializes it must register itself in the DRM database (registry) before any data processing can begin. The information that DRM maintains on each task is used by the Framework to perform housekeeping functions and allow a globally controlled place to hold task information so that the framework and other tasks have access to it.

Each Task manages itself by scheduling execution only after a full data frame has been received of data to be processed. The DSP System is a "pushed" data type system, which means data is sent to the DSP system without being directly requested. So the DSP system must be capable of processing data faster than the incoming data rate because the DSP System Framework does not allow for queuing of data to tasks. The Algorithms running in the DSP are DAIS-compliant and are not concerned with how the data is gathered, only that input data is presented to the Algorithm all at once as a complete frame of data. The task shall not be involved in the gathering of input data that is handled by the DSP system framework and the DRMS.

Requirements for DSP System Resource Manager Server:
1. Must get algorithm to process entire frame and not be switched once or twice before processing a frame (high overhead of switching in data overlay of algorithm).
2. Schedule tasks only after complete input data frame is ready
3. Maintain task database for use by framework:
    a. Task on-chip data overlay
    b. Inter-process communication Each Algorithm in the DSP System is required to be DAIS-compliant. This requires that the Algorithms be presented their data in Frame buffers. The data for the Frame buffers must either come from local peripheral devices located in the DSP system or from a virtual device represented by a buffer located locally within the physical boundaries of the DSP system. Typically the DSP system will be a sub-system that is interfaced to a General Purpose Processor (GPP) which is given the role of supervisor or Host processor. The DSP and Host systems are interfaced together using perhaps shared memory or a bus type interface. This abstraction is referred to as the DSP Bridge/Link. On this link will be a driver to manage the movement of data across the link. When the DSP system is implemented as part of a larger system, data will predominantly enter and leave the DSP system through the Host/DSP Bridge.

Figure 5:
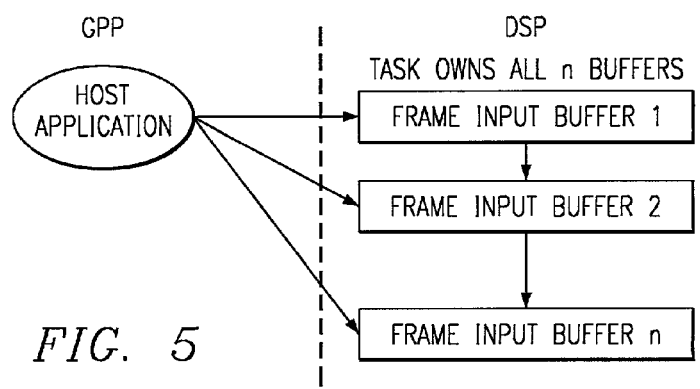
FIGS. 5–6 show buffer use.
Figure 6:
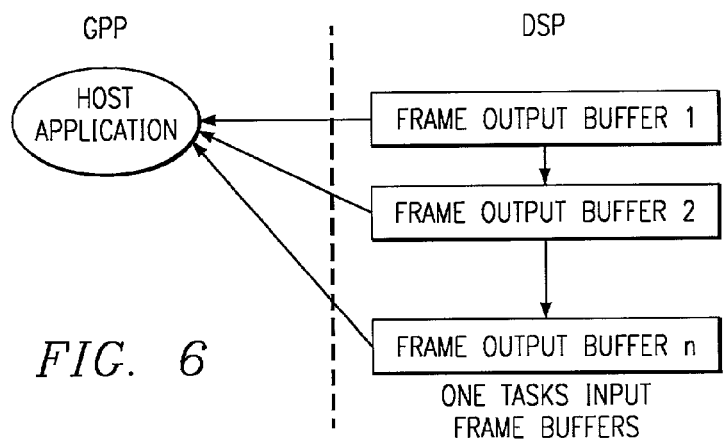

The connection between the Host and DSP task is statically defined at build time of the DSP and Host systems. Alternative preferred embodiments of the DSP framework allow for a dynamic task create and destroy. Each task on the DSP will have two simplex channels using a stream I/O of the DSP OS with the Host thread/task that it is serving. These two channels are for receiving commands from the host for each frame of data received and to return status signals after each frame of data has been processed. Data will be passed between the Host and DSP in complete buffers representing one complete frame of data (input and output frame). Since there is only one buffer in each direction a DMA utility of the bridge driver will use to transport the data frame in both directions. See FIGS. 5–6.

For preferred embodiment DSP systems which are defined as static in the number of tasks, there is no need to create and destroy tasks, therefore there does not need to be an active portion of DRMS to initiate tasks. Therefore there is no need to have a dynamic centralized provider for server functions. Alternative preferred embodiments require the ability to create and destroy tasks and therefore will need an active DRMS to handle these requests.

Figure 4:
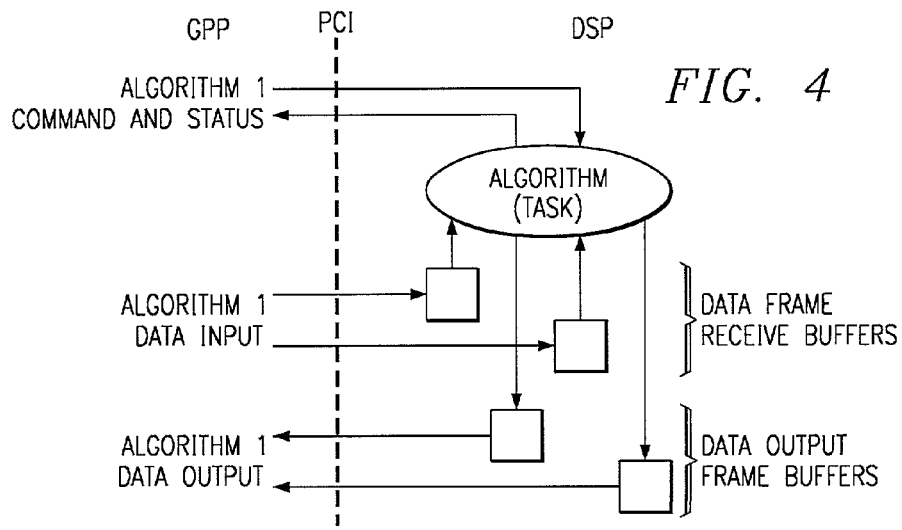

Summary of events between a Host system and the DSP system:
1. Algorithm initializes and registers itself with the DRMS.
2. Algorithm sends a status message on a predefined channel to the Host that indicates the DSP system is ready to process data. Contained in the message from the DSP system is a pointer in DSP memory of where to put the input data frame.
3. Algorithm blocks (waits) for a command from host specifying what to do.
4. Data is being transferred in the background from host to specified data buffer on the DSP system while the task is blocked.
5. Host sends a message to blocked task on DSP system to decode a frame of size "y".
6. Task unblocks and sends a message to host to send next frame to a different input buffer. Task then processes data in current received buffer.
7. Host now starts to transfer block of data to next Task input buffer in the background of DSP processing.
8. After completing the processing of input data frame the Task now sends a message to the Host that processing of input frame has finished and is of size "z" and where the output frame is in the DSP system as well.
9. Host receives message from DSP that processing is complete, initiates receiving of data from processed buffer in the background of DSP processing.
10. Repeat steps 3–9 for each subsequent frame; see FIG. 4.

The first steps have already been described in that when the task initializes it must register itself with DRMS. This initialization defines the task first, then the amount of memory needed by the task for on-chip workspace memory (algorithm data overlay/stack) inside the DSP.

When the system is operational the Host will be sending commands (encode, decode, etc.) to the task on the DSP system. These commands will give parameters to the DSP task, commands etc. on what to do with the received data frame. Typically this will be the same command over and over with perhaps the parameters sent along with command varying from frame to frame such as received frame size.

The command serves another purpose as well and that is as a synchronization mechanism. The DSP in turn will need to communicate results or statuses after each completed output data frame. The Algorithm implementers and the system integrators during the algorithm integration process define all message structures and values that will be passed when the system is operational. This message passing is required because task synchronization or task scheduling depends on it, but the design is left completely open to implementers and integrators to decide what values are to be passed.

After the Task has completed the registration process, the DSP system sends a message to the Host processor on a pre-defined channel set up statically at build time to signal that the task is ready for data. In this message will be a pointer for the Host system to put the input data frame. The integration process defines what this buffer size should be.

The DSP Task blocks on waiting for a message from Host thread/task that it is connected with. When the DSP Bridge delivers the message to the DSP System the Task is unblocked and readied to run. When the DSP task gains control from the DSP OS it examines the command received from the host and starts processing the data in the receive buffer frame based on this command. Note the implementers of the DSP task and the accompanying Host task/thread define the commands that work between the Host Application and the DSP task.

The data frame is transferred to the DSP from the Host using the DMA utility of the host based link driver. This transfer will take place in the background of the DSP system. After the DSP system specifies the buffer the host will place and remove all data in the input and output frames. See FIGS. 5–6.

Once the host has completed placing the input data frame into the buffer in the DSP system, the host will send a message across the DSP Bridge to the DSP system. This command indicates the input data frame is now ready for processing, included in the message is the size of the data frame sent.

| command |
| size of frame |
| address of buffer frame |

When the DSP task receives the message it will be unblocked or readied to run by the OS. The DSP task will start to process the frame, the task will run until the frame is completely processed (correctly or with error) and the output frame is ready for transfer back to the host. Once all the output data is in the output frame the DSP task sends a message to the host that indicates completion of the frame processing. Contained within that message is buffer pointer in the DSP system that is ready to receive the next frame of input data for the DSP task.

Note that the DSP system relies on the Host processor not to overrun the DSP system with unbalanced requests. The data should be sent to the DSP in matched sets or at least symmetrical sets.

The host receives the completion message with the next input buffer address for the DSP task will now start to do two back ground moves of data. First is to recover the processed frame of data and the next is to send the next frame of input data to the buffer indicated by the DSP task. This is the end of the processing loop that processes the data, the host and DSP task will now repeat these steps until there is no more data to process.

GPP Media Framework System

The GPP media framework (JMF 2.0) extension by the DSPPlugin interface is analogous to the JMF Plug-In API in that it allows plug-ins to be accessed by application programs.

Class DSPPlugIn

| java.lang.Object |
|    | |
| +--com.ti.media.dsp.DSPPlugIn |

All Implemented Interfaces:
  javax.media.Controls
  javax.media.PlugIn
public abstract class DSPPlugIn
extends java.lang.Object
implements javax.media.PlugIn Implementors of DSPPlugIns will extend this class. DSPPlugIns use the resources of the DSPSystem to process media frames.

Implementors of a particular DSPPlugIn (e.g. com.ti.media.codec.video.mpeg) will typically provide a no-argument constructor that calls the superclass base constructor with the appropriate input/output Format arguments. A base implementation of a PlugIn is provided that has input_format.length input tracks and output_format.length output tracks. For example, a Codec that extends this class can define its process method:

```
public int process (Buffer in, Buffer out) {
    if (inputBuffer(in, 0)== BUFFER_PROCESSED_OK)
    return outputBuffer(out, 0);
}
```

A Format might have data type DSPSystem.internalArray which means that the input or output's data remains internal to the DSPSystem. It can only be connected to an input or output of another DSPPlugIn.

Figure 7:
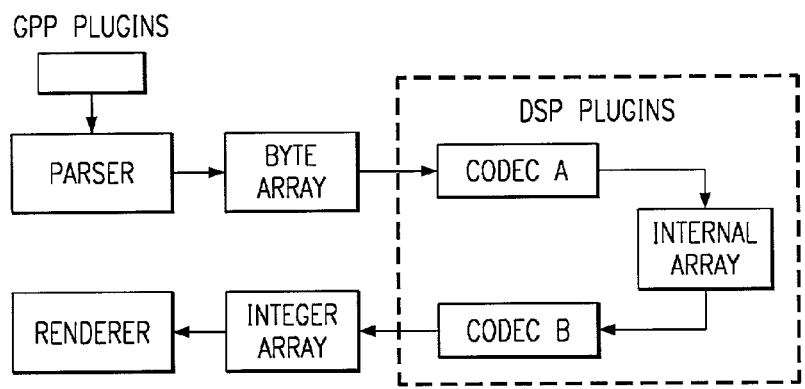
FIG. 7 illustrates data flow.

FIG. 7 shows data flow through a PlugIn graph with two DSPPlugIns. The intermediate data between the two Codecs remains in the DSPSystem as an DSPSystem.internalArray.

Fields inherited from interface javax.media.PlugIn:
BUFFER_PROCESSED_FAILED,
BUFFER_PROCESSED_OK,
INPUT_BUFFER_NOT_CONSUMED,
OUTPUT_BUFFER_NOT_FILLED DSPPlugIn Constructor
protected DSPPlugIn(javax.media.Format[ ] input_formats,
  javax.media.Format[ ] output_formats)

This is the base DSPPlugIn constructor, and provides the connection with the resources of the DSPSystem. A base implemention of a Plugin connected to the DSPSystem is provided that matches in input and output Formats. For example, an H.263 codec can be defined extension of DSPPlugIn that is

```
package com.ti.media.codec.video.h263;
    public class DSPDecoder {
        static final VideoFormat[] inputs =
            { new VideoFormat(VideoFormat.H263, ...) };
        static final VideoFormat[] outputs =
            { new VideoFormat(VideoFormat.YUV, ...) };
```

```
public DSPDecoder() {
    super(inputs, output);
    ...
}
```

Method Details
getNumberInputTracks
protected int getNumberInputTracks( )
   Return the number of input tracks going into this DSP-PlugIn.
getNumberOutputTracks
protected int getNumberOutputTracks( )
   Return the number of output tracks going into this DSP-PlugIn.
inputBuffer
protected int inputBuffer(javax.media.Buffer buffer,
   int trackID)
   Input a buffer from an input track for processing.
outputBuffer
protected int outputBuffer(javax.media.Buffer buffer,
   int trackID)
   Output a buffer to an output track. This will block until a buffer is ready. It could be the case that the buffer's data remains DSPSystem.internalArray, if that is the data type of the format for this track.
sendData
protected int sendData(byte[ ] data,
   int offset,
   int length)
   Send a message packaged as a byte array. The implemetation of controls of an extension of DSPPlugIn can call this based on a system dependent protocol.
getMaxProcessingTime
public long getMaxProcessingTime( )
   Returns the maximum processing time needed for processing inputs to outputs.
getAverageProcessingTime
public long getAverageProcessingTime( )
   Returns the average processing time needed for processing inputs to outputs.
Methods inherited from class java.lang.Object
clone, equals, finalize, getclass, hashCode, notify, notifyAll, toString, wait, wait, wait Class DSPSystem

```
java.lang.Object
  |
  +--com.ti.media.dsp.DSPSystem
``` public final class DSPSystem
extends java.lang.Object
The DSPSystem provides for loading DSP programs which provide DSPPlugins.

Field Details
internalArray
static java.lang.Class internalArray
   A Buffer with have this datatype for its data if the frame is internel to the DSPSystem.
   getData( )will return null.

Figure 8:
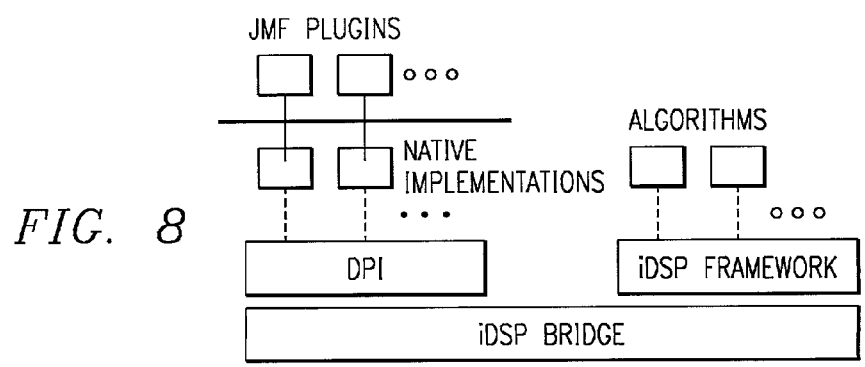
FIG. 8 shows interface architecture.

Method Details
load
static void load(java.lang.String[ ] filename)
Methods inherited from class java.lang.Object
clone, equals, finalize, getClass, hashCode, notify, notifyAll, toString, wait, wait, wait DSP Plug-in Interface
   The DSP Plug-in Interface (DPI) 130 provides an application programmer interface to DSP media processing units for high performance media processing. The DPI API specification is described below as both a "native" C API and a Java API "wrapper" for the developer of JMF PlugIns. A DSPPlugIn provides the base class. DPI can also be used to provide DSP media components for other frameworks, such as Microsoft Corporation's DirectShow.
   FIG. 8 shows how the DSP reference implementation of DPI connects the native implementation of JMF plug-ins to DSPFramework compliant DSP algorithms. iDSPBridge is the runtime component for connecting plug-ins implemented with DPI and DSPFramework algorithms.

DPI Datatypes
   A set of primitive datatypes:
DPI_void
DPI_char
DPI_byte
DPI_int
DPI_long
DPI_float
DPI_double
DPI_String
   These types are defined in dpi.h.
   A set of constructed datatypes:
typedef struct {
DPI_String encoding; // A string identifier, such as "H263"
DPI_int dataType; // One of the DPI_DATATYPE_constants
DPI_int attributesSize; // The size of attributes
DPI_void* attributes; // Pointer to the memory block of attributes
DPI_int maxBufferSize; // Maximum size of memory of dataType needed
} DPI_Format;
   The encoding string holds an identifier for the encoding format. The dataType defines the type of array of data in the data buffers on the media track with this format. The attributes data object holds the parameters needed for this media format; the datatypes of the parameters may need to be cast to the appropriate type. For example, an audio format may have the following attributes
DPI_double sampleRate
DPI_int sampleSizeInBits
DPI_int channels stored in attributes as an array of bytes.
typedef struct {
DPI_int flags; // A boolean OR of DPI_FLAGs
DPI_long sequenceNumber; // The sequence number for this buffer
DPI_long timeStamp; // The timestamp for this buffer
DPI_long qos; // future use
DPI_Format* format; // Pointer to the format for this buffer
DPI_int headerSize; // Size of header in bytes
DPI_void* header; // Header
DPI_int size; // Size of data chunk in format→dataType DPI_void* chunk; // Data chunk to be processed
} DPI_Buffer;

DPI dataflow

A DPI_Buffer is a container for a chunk of media data as it movers form one processing stage to the next. The datatype of the buffer is provided by format→dataType. If the datatype of a buffer is one of the DPI_DATATYPE_DSP types, then this means the actual data is held in DSP internal memory and is not available for processing unless provided by another plug-in down the chain that returns a non-DSP datatype. In the case of a DPI_DATATYPE_DSP type, this means that the chunk member of the buffer's data is NULL. FIG. 9 shows a dataflow where the data chunks remain in DSP memory.

typedef struct {
DPI_String name; // A string identifier of plug-in
DPI_int number_inputs; // Number of input tracks
DPI_Format** input_format; // Associates a format for each input track
DPI_int number_outputs; // Number of output tracks
DPI_Format** output_format; // Associates a format for each output track
} DPI_PlugIn;

A generalized plug-in datatype provides for an arbitrary number input and out tracks (media dataflows). Specific plug-ins, such as JMF Demultiplexer, Codec, Effect, Renderer, Multiplexer will have a fixed number of input/output tracks. For example, a Codec has a single input and a single output track. In this version of DPI, a DSP plug-in only supports a single format on each input and output track.

DPI Constants

A set of constants defining the buffer datatypes and processing results.
DPI_DATATYPE_BYTEARRAY
DPI_DATATYPE_INTARRAY
DPI_DATATYPE_SHORTARRAY
DPI_DATATYPE_DSPBYTEARRAY Indicates data that remains in DSP internal memory.
DPI_DATATYPE_DSPINTARRAY Indicates data that remains in DSP internal memory.
DPI_DATATYPE_DSPSHORTARRAY Indicates data that remains in DSP internal memory.
DPI_BUFFER_PROCESSED_FAILED
DPI_BUFFER_PROCESSED_OK
DPI_INPUT_BUFFER_NOT_CONSUMED Input buffer not consumed.
DPI_OUTPUT_BUFFER_NOT_FILLED Output buffer not filled.
DPI_PLUGIN_TERMINATED The processing of the given buffer caused plug-in termination.
DPI_SUCCEEDED
DPI_ERROR Two Additional Constants
DPI_TIME_UNKNOWN The value of a DPI_Buffer timestamp if unknown
DPI_SEQUENCE_UNKNOWN The value of a DPI_Buffer sequenceNumber if unknown
A set of constants for flags on DPI_Buffers.
DPI_FLAG_EOM Marks the end-of-media.
DPI_FLAG_DISCARD Indicates this buffer is to be ignored.
DPI_FLAG_SILENCE Buffer contains only silence frames.
DPI_FLAG_SID Buffer contains Silence Information Description frames.
DPI_FLAG_KEY_FRAME Buffer starts with a key frame.
DPI_FLAG_NO_DROP Buffer will not be dropped even if frame is behind presentation schedule.
DPI_FLAG_NO_WAIT Buffer will not be waited on even if frame is ahead of schedule.
DPI_FLAG_NO_SYNC Buffer is not to be presented in sync.
DPI_FLAG_SYSTEM_TIME Buffer carries a time stamp relative to the system clock.
DPI_FLAG_RELATIVE_TIME Buffer carries a time stamp that is relative to some media start time.
DPI_FLAG_FLUSH The entire media stream is to be flushed.

DPI Functions
DPI PlugIn* DPI_create(DPI_String name,
DPI_int number_inputs,
DPI_Format** input_formats,
DPI_int number_outputs,
DPI_Format** output_formats)
Creates a plug-in with identifier name for a specified number of input and output formats.
DPI_open( ) must be called to allocate and connect it to the necessary resources. NULL is returned if DPI_create was not successful.
void DPI_open (DPI_PlugIn* plugin)
Opens the plug-in and connects it to resources utilized by this plug-in.
void DPI_close (DPI_PlugIn* plugin)
Closes the plug-in and releases the resources utilized by this plug-in.
void DPI_reset (DPI_PlugIn* plugin)
Resets the plug-in.
DPI_int DPI_connect (DPI_PlugIn* p1, DPI_int outputTrack;
DPI_PlugIn* p2, DPI_int inputTrack)
If output track outputTrack of plug-in p1 and input track inputTrack of plug-in p2 match formats and both have datatype DPI_DATATYPE_DSP then this will cause the same data memory to be used for output buffer and input buffers for the two plug-ins.
DPI_int DPI_process(DPI_PlugIn* PlugIn, DPI_int trackID, DPI_Buffer* buffer)
Consumes a buffer for processing from an input track. Return code is one of the DPI_BUFFER_constants.
DPI_int DPI_read(DPI_PlugIn* PlugIn, DPI_int trackID, DPI_Buffer* buffer)
Produces a buffer for an output track. Return code is one of the DPI_BUFFER_constants.
int DPI_setTransferHandler(DPI_PlugIn* plugin,
int trackID,
DPI_int
(*transfer_handler) (DPI_PlugIn*, int trackID))
On an output media track of a plug-in, this places a callback transfer_handler which is called when a buffer is ready for a read call to be made without blocking.
DPI_int getHashCode (DPI_PlugIn* plugin)
Returns a hash code for this plug-in. This function is used to provide a unique identifier for the native object in a JNI implementation of a JMF PlugIn.
DPI_PlugIn* getPlugIn(DPI_int hashcode)
Returns the plug-in mapped to this hash code. This function is used to map the unique identifier for the native object in a JNI implementation of a JMF PlugIn.
int DPI_control(DPI_PlugIn* plugin,
DPI_int sizeof_input, DPI_void* input,
DPI_int sizeof_output, DPI_void* output)

A control interface to a plug-in, where a data block input is sent to the plug-in, and the result is copied to output. This can be used to implement a gain control on an audio plug-in, for example.
DPI_SUCCEEDED or DPI_ERROR is returned.

JMF Interface

A Java API to DPI is provided in the com.ti.media.dpi package, which consists of the following classes:

```
com.ti.media.dpi.DSPFormat
public class DSPFormat extends javax.media.Format {
// Public Instance Variables
public static final Class dspByteArray;
public static final Class dspIntArray;
public static Class dspShortArray;
// Public Constructor
public DSPFormat(String encoding, Class datatype, byte[ ]
    attributes);
// Public Instance Methods
public byte[ ] getAttributes( )
}
```

DSPFormat extends javax.media.Format by adding additional datatypes for buffers whose data chunk is stored on the DSP, as well as a generic attributes property which represents the attributes as a byte array. The interpretation of the attributes is based on the encoding. A JMF format can be mapped to a DSPFormat by copying its attributes into a byte array:

```
import java.io.*;
...
ByteArrayOutputStream attr_stream=
new ByteArrayOutputStream( );
DataOutputStream attr_data=
new DataOutputStream(attr_stream);
try {
// here the attributes of the format are written
attr_data.writeDouble(sampleRate);
attr_data.writeInt(sampleSizeInBits);
...
}
catch (Exception e) { }
byte[ ] attributes=attr_stream.toByteArray( );
...

com.ti.media.dpi.DSPPlugIn
public abstract class DSPPlugIn implements javax.media-
    .PlugIn {
// Public Constructor
public DSPPlugIn(String name,
DSPFormat[ ] input_formats,
DSPFormat[ ] output_formats);
// Public Instance Methods
void open( );
void close( );
void reset( );
boolean connect(int outTrackID, DSPPlugin next_plugin,
    int inTrackID);
int process(javax.media.Buffer buffer, int trackID);
int read(javax.media.Buffer buffer, int trackID);
void setTransferHandler(int trackID, DSPTransferHandler
    transferHandler);
int control(byte[ ] input, byte[ ] output);
```

DSPPlugin is an abstract class that provides the native implementation for a JMF PlugIn. This abstract class can be extended to make a concrete Plugin. A constructor is provided which creates a plug-in based on a vector of input formats and a vector of output formats, one for each media track. The lengths of the two vectors specifies the number of input and output media tracks that this plug-in is connected to. The instance methods open( ), close( ), and reset( ) are PlugIn methods. The connect( ) method connects the output track outTrackID to the input track inTrackID of next_plugin. The result of this is that the DSP memory data will remain on the DSP. The process( ) and read( ) methods are used to process a buffer from an input track and read a buffer from an output track respectively. In particular, read( ) will block until data is ready. If setTransferHandler( ) is called with a DSPTransferHandler transferhandler, then when data is ready to be read on output track trackID, transferHandler.transfer(this, trackID) is called. Finally, control( ) is used to pass an arbitray control message input to the plug-in, and the response is copied to output.

```
com.ti.media.dpi.DSPTransferHandler
public interface DSPTransferHandler {
public void transfer(DSPPlugIn plugin, int trackID);
}
```

When a buffer is ready to be read on an output track trackID of a DSPPlugIn, the transfer( ) method is called on the DSPTransferHandler instance that is attached to it.

What is claimed is:

1. A system, comprising:
(a) a general purpose processor;
(b) a digital signal processor coupled to said general purpose processor;
(c) a first software system operating on said general purpose processor, said first software system including a media framework with a first interface for a plug-in;
(d) a second software system operating on said digital signal processor, said second software system including a second framework with a second interface for a plug-in;
(e) said first and second software systems each containing portions forming a communication bridge coupling said first and second software systems;
(f) an extending interface in said first software system, said extending interface coupling to said second framework; and
(g) said second framework includes a resource manager which registers a plug-in to said second plug-in interface.

2. The system of claim 1, wherein:
said plug-in is a media codec.

* * * * *